United States Patent

Carpenter et al.

[15] 3,653,073

[45] Mar. 28, 1972

[54] HANDLER PROGRAM FOR REMOTE INPUT MANAGEMENT SYSTEM

[72] Inventors: Ralph L. Carpenter, Oakland; Richard C. Zuchowski, San Francisco, both of Calif.

[73] Assignee: Kaiser Aluminum & Chemical Corporation

[22] Filed: Aug. 19, 1969

[21] Appl. No.: 851,370

[52] U.S. Cl. ............................................. 444/1, 340/172.5
[51] Int. Cl. ........................................................ G06f 9/18
[58] Field of Search .............................. 340/172.5; 235/157

[56] References Cited

UNITED STATES PATENTS

| | | | |
|---|---|---|---|
| 3,303,476 | 2/1967 | Moyer et al. | 340/172.5 |
| 3,390,379 | 6/1968 | Carlson et al. | 340/172.5 |
| 3,400,376 | 9/1968 | McDonnell | 340/172.5 |
| 3,406,380 | 10/1968 | Bradley et al. | 340/172.5 |
| 3,266,023 | 8/1966 | Werme | 340/172.5 |
| 3,411,139 | 11/1968 | Lynch et al. | 340/172.5 |
| 3,427,593 | 2/1969 | Wells et al. | 340/172.5 |

OTHER PUBLICATIONS

IBM System/360 Basic Programming Support Basic Utilities, File No. S360- 32, Form C28- 6505-1, Feb. 1965, Pages 35-64

*Primary Examiner*—Paul J. Henon
*Assistant Examiner*—Sydney R. Chirlin
*Attorney*—Fulwider Patton Richer Lee and Utecht

[57] ABSTRACT

A digital computer program in the ALGOL language for interfacing between remote hardware terminals and a program entitled Main Processing Program. This program passes all data to and from the remote terminals and the Main Processing Program.

13 Claims, 1 Drawing Figure

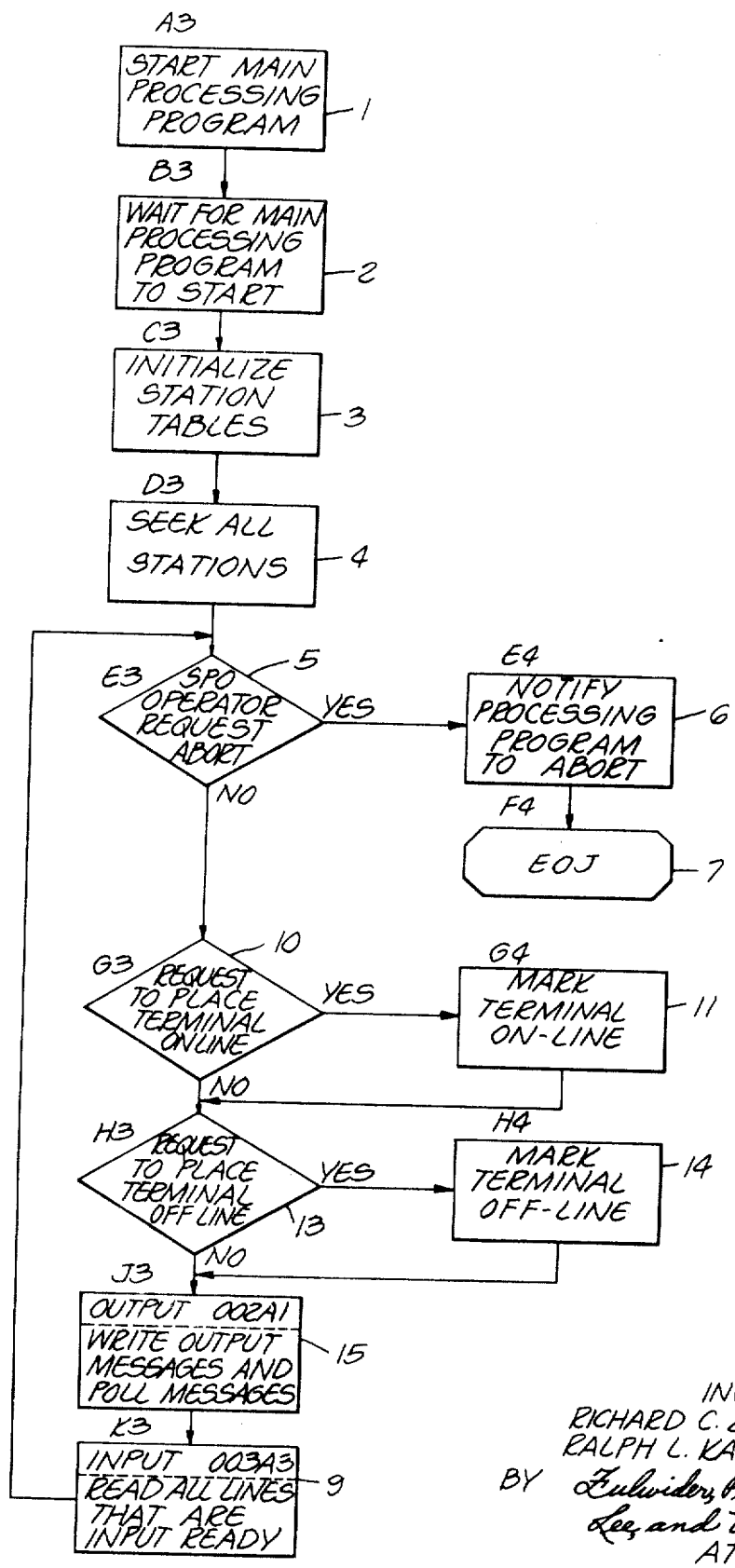

HANDLER PROGRAM FOR REMOTE INPUT MANAGEMENT SYSTEM

This invention is a digital computer program and, more particularly, a digital computer program for passing data to and from remote terminals in a data processing system.

In accordance with this invention, provision is made for the transfer of computer commands and data between a centrally located computer and a plurality of remote terminals.

The program of this invention maintains the status of any number of connected terminal devices. In a closed loop process, it repetitively determines first whether any terminals are to be supplied an output. If an output is to be supplied, the program controls checks as to the validity of the output data. If the data is found to be valid, the output function is performed.

Following the output process, the program then determines whether any input devices have data for transmission to the computer. If so, the program causes execution of a subroutine to accept the inputs, the subroutine chosen depending upon the type of device delivering the input.

Material essential to the understanding of this invention is found in U.S. Pat. No. 3,585,601, filed Aug. 19, 1969, for Remote Input Management System, which material is herein incorporated by reference and made a part of this application.

More specifically, reference is made to Section V of said U.S. Pat. No. 3,585,601, including Subsections 1, 2 and 3. Subsection 3, therein, contains the associated program source listing in ALGOL. The listing may be readily compiled by any computer which will accept that language.

The drawing herein is the flowchart of the outer block of the Handler program. In addition, reference is made herein to FIGS. 11A, 11B, 12, 13A and 13B in the above-cited U.S. Pat. No. 3,585,601 for further disclosure herein.

We claim:

1. In a method of operating a digital computer connected in a network with one or more remote terminals, the steps of controlling execution of a program for processing inputs from said remote terminals, execution of a first sub-program for delivering digital information from control of the processing program to the remote terminals, comprising the steps of controlling a determination of whether all possible sources of said digital information have been checked for readiness to deliver said information, and transfer of said information in each case a source is found so ready, and execution of a second sub-program for delivering digital information from said terminals to control of said processing program, comprising the steps of controlling a reading of all said digital information ready for delivery from said terminals, and a calling of a transfer routine determined by the type of terminal from which said digital information was read.

2. The method of claim 1, further comprising the step of controlling a wait period while the processing program is being initialized.

3. The method of claim 1, further comprising the steps of controlling a determination as to whether the computer operator has requested the method to terminate itself and the processing program, transmission of a termination message to the processing program if it is determined that such an operator request has been made, and termination of the method following said transmission.

4. The method of claim 1, further comprising the step of controlling notification to the computer operating system program of which input lines are to deliver input for control by the processing program.

5. The method of claim 1, further comprising the step of controlling a determination as to whether remote terminals are placed on-line or off-line.

6. The method of claim 1, further comprising termination of said sub-program if all lines are interrogated and no output is found ready for delivery.

7. The method of claim 1, wherein said step of controlling transfer by said first subprogram comprises the steps of controlling a determination of the class of terminal for which it had been determined that output is ready for delivery thereto, transfer of a portion of said ready output data to an output buffer, and, transfer of the portion of said ready output data from said output buffer to the terminal for which it had been determined that output is ready.

8. The method of claim 7, further comprising the step of controlling the transmission of initial control characters to the terminal for which it had been determined that output is ready for delivery thereto.

9. The method of claim 7, wherein said step of controlling transfer of a portion of said ready output data to an output buffer comprises the steps of controlling substitution of characters within said ready output data when the original characters cannot be received by the terminal to which the data is being transmitted, and, a determination of whether further portions of output data are to be transferred to the terminal to which the current portion is being transmitted.

10. The method of claim 7, wherein said step of controlling transfer of the portion of said ready output data from said output buffer to the terminal comprises the steps of controlling writing the portion of said ready output data on said terminal, and, a determination of whether more portions of output data are to be transfered to said terminal.

11. The method of claim 10, further comprising the step of controlling transferring of further portions of ready output data to the output buffer if it is determined that more portions of output data are to be transferred to said terminal.

12. The method of claim 1, wherein the step of controlling transfer of digital information to a terminal for which it is determined that output is ready comprises the steps of controlling a determination of the class of terminal for which it had been determined that output is ready, substitution of characters within said ready output data when the original characters cannot be received by the terminal to which the data is being transmitted, transfer of a portion of said ready output data to an output buffer, a first determination of whether further portions of output data are to be transferred to the terminal to which the current portion is being transmitted, writing the portion of said ready output data on said terminal, a second determination of whether further portions of output data are to be transferred to the terminal to which the current portion is being transmitted, and, if the answer to said second determination is in the affirmative, transfer of a further portion of said ready output data to the output buffer.

13. In a method of operating a digital computer connected in a network with one or more user's remote terminals, wherein output is transferred from control of a processing program to the remote terminals, the steps of controlling interrogation of lines connecting the computer and the remote terminals to determine if output is ready to be delivered to each line, a determination as to whether all lines have been interrogated, a determination as to whether a remote terminal is a device which must be polled to find whether it has input to deliver, transmission of a poll inquiry to each terminal determined to require polling, determination as to whether output is ready for delivery to each terminal, and transmission of data to each terminal for which data is ready.

* * * * *